(12) United States Patent
Rife et al.

(10) Patent No.: US 12,450,386 B2
(45) Date of Patent: Oct. 21, 2025

(54) INTELLIGENT FEATURE CONTROL

(71) Applicant: Microsoft Technology Licensing, LLC, Redmond, WA (US)

(72) Inventors: Ryan Wayne Rife, Maple Valley, WA (US); Sharan Babu Paramasivam Murugesan, Redmond, WA (US); Patrick Roy Ruddiman, Jr., Woodinville, WA (US); Yanxi Tang, Tustin, CA (US); Kunal Parimal Patel, Redmond, WA (US)

( * ) Notice: Subject to any disclaimer, the term of this patent is extended or adjusted under 35 U.S.C. 154(b) by 226 days.

(21) Appl. No.: 18/144,516

(22) Filed: May 8, 2023

(65) Prior Publication Data
US 2024/0378310 A1 Nov. 14, 2024

(51) Int. Cl.
*G06F 21/00* (2013.01)
*G06F 9/455* (2018.01)
*G06F 21/62* (2013.01)

(52) U.S. Cl.
CPC ...... *G06F 21/6245* (2013.01); *G06F 9/45558* (2013.01); *G06F 2009/45587* (2013.01); *G06F 2009/45591* (2013.01)

(58) Field of Classification Search
CPC ............. G06F 21/6245; G06F 9/45558; G06F 2009/45587; G06F 2009/45591; G06F 3/0482; G06F 9/4843
See application file for complete search history.

(56) References Cited

U.S. PATENT DOCUMENTS

| | | | |
|---|---|---|---|
| 11,030,071 B2 | 6/2021 | Mosquera et al. | |
| 11,392,351 B2 | 7/2022 | Chang et al. | |
| 2016/0119450 A1* | 4/2016 | Khasnabish | H04L 69/12 709/224 |
| 2018/0191782 A1 | 7/2018 | Djordjevic et al. | |
| 2019/0108116 A1 | 4/2019 | Benes et al. | |
| 2019/0318240 A1 | 10/2019 | Kulkarni et al. | |
| 2020/0050330 A1* | 2/2020 | Schilling | G06F 9/451 |
| 2021/0182114 A1 | 6/2021 | Vyas et al. | |
| 2021/0192401 A1 | 6/2021 | Chandrasekaran et al. | |
| 2022/0027044 A1* | 1/2022 | Capurso | G06F 3/04895 |

(Continued)

OTHER PUBLICATIONS

International Search Report and Written Opinion received for PCT Application No. PCT/US2024/026728, (MS# 412745-PCT01) Oct. 30, 2024, 15 pages.

(Continued)

*Primary Examiner* — Kendall Dolly
(74) *Attorney, Agent, or Firm* — Workman Nydegger

(57) ABSTRACT

Techniques for locally executing a feature control system on a computer system are disclosed. The feature control system locally controls a feature of an application, which is also locally executing on the computer system, such that both the feature control system and the application execute on the same infrastructure of the computer system. The application is accessed, and that application's feature is determined to have a first state during an initial usage of the application. The feature control system controls whether the feature is to continue to have the first state or is to transition to having a second state. The feature control system determines that the feature is to transition to having the second state. A local command is issued to transition the feature from having the first state to having the second state.

19 Claims, 14 Drawing Sheets

(56) References Cited

U.S. PATENT DOCUMENTS

2022/0308869 A1    9/2022   Jain et al.
2022/0398078 A1    12/2022  Segler
2023/0401077 A1*   12/2023  Anand ................ G06F 9/45558

OTHER PUBLICATIONS

"FeatureHub", Retrieved From: https://web.archive.org/web/20221202233016/https://www.featurehub.io/, Dec. 2, 2022, 5 Pages.
"Harness Feature Flags", Retrieved From: https://web.archive.org/web/20230117200638/https://developer.harness.io/docs/feature-flags/ff-onboarding/cf-feature-flag-overview/, Jan. 17, 2023, 2 Pages.
"Optimizely: Use Feature Flags", Retrieved From: https://web.archive.org/web/20220626051256/https://docs.developers.optimizely.com/full-stack/v2.1/docs/use-feature-flags, Jun. 26, 2022, 51 Pages.
Bost, Bryant, "Build Real-Time Feature Toggles with Amazon DynamoDB Streams and Amazon API Gateway WebSocket Apis", Retrieved From: https://aws.amazon.com/blogs/devops/build-real-time-feature-toggles-with-amazon-dynamodb-streams-and-amazon-api-gateway-websocket-apis/, Apr. 30, 2021, 6 Pages.

* cited by examiner

INTELLIGENT FEATURE CONTROL

BACKGROUND

With the advent of cloud computing, applications can now be hosted in a remote location relative to a user device. The application executes on the infrastructure provided by the cloud, and users can use their computers to access that cloud-based application over a network connection.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for locally executing a feature control system on a computer system and for enabling the feature control system to locally control a feature of an application, which is also locally executing on the computer system. Consequently, both the feature control system and the application execute on the same computing infrastructure.

In some aspects, the techniques described herein relate to a method implemented by a computer system, the method including: accessing an application, which includes a feature, wherein the feature has a first state during an initial usage of the application; accessing a feature control system, which controls whether the feature is to continue to have the first state or is to transition to having a second state; collecting metric data describing a behavior of the application; based on the metric data, determining that the feature is to transition to having the second state; and using the feature control system to issue a local command to the application, wherein the local command causes the application to transition the feature from having the first state to having the second state.

In some aspects, the techniques described herein relate to a computer system that locally implements a feature control system and that enables the feature control system to control a feature of an application, which is also executing on the computer system, such that both the feature control system and the application execute on a same infrastructure of the computer system, the computer system including: a processor system; and a hardware storage system that stores instructions that are executable by the processor system to cause the computer system to: access an application, wherein the application includes a feature that is currently turned on such that the feature is available for use, and wherein the application manages a database of information describing a state of the application; locally instantiate a feature control system that controls whether the feature is turned on or is turned off; collect time series data describing the information included in the database; based on the time series data, determine that the feature is to be turned off; and cause the feature control system to instruct the application to turn the feature off such that the feature is no longer available for use.

In some aspects, the techniques described herein relate to a method implemented by a computer system, the method including: accessing an application, wherein the application includes a feature that currently has a first state, and wherein the application manages a database of information associated with the application; locally instantiating a feature control system that controls whether the feature has the first state or has a second state; causing the feature control system to collect data describing the information included in the database; based on the data, causing the feature control system to determine that the feature is to transition from having the first state to having the second state; and causing the feature control system to instruct the application to transition the feature from having the first state to having the second state.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
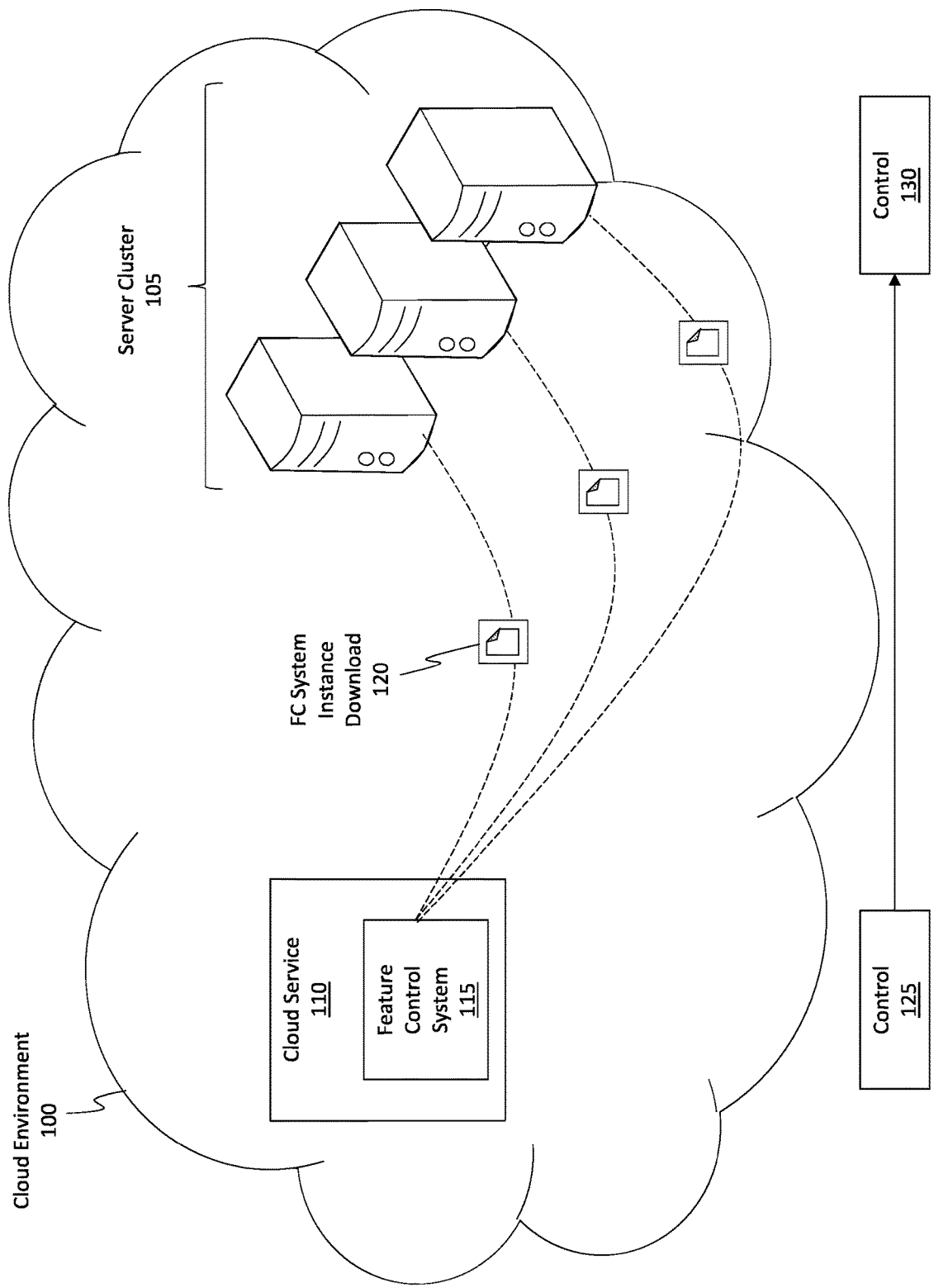
FIG. 1 illustrates an example of an improved environment for performing local-based feature control.

The term "feature," when used in the context of an application, generally refers to a distinguishable aspect or characteristic of that application. A "feature" can be related to a function of the application, a performance of the application, a portability of the application, or perhaps even to a visual appearance of a user interface ("UI") associated with the application.

Traditional techniques for performing feature control face a number of issues. These issues include lagging or latency in the rollout or rollback procedure. Sometimes, due to the latency, applications would operate using an outdated feature, resulting in performance problems or usability problems. The issues further include scaling problems. For instance, if the content associated with one tenant or client using the application suddenly went "viral" (e.g., spread to numerous online users within a short time period), the load for that client's application would significantly increase, resulting in an increased demand on the feature control system. What often happens is that a traditional feature control system would not be able to adequately scale to meet the new demand, so other applications would suffer from decreased management (e.g., slower performance) from the feature control system. Yet another issue with the traditional techniques is that those techniques failed to include intelligence as to when and how a feature should be controlled (e.g., turning the feature on or off). What is needed, therefore, is an improved feature control system that reduces latency, improves scalability, and capitalizes on intelligence to determine when and how to control an application's feature.

The disclosed embodiments relate to systems, devices, and methods that locally instantiate and execute a feature control system on a computer system. By "locally," it is meant that the feature control system operates on the same infrastructure as the application the feature control system is managing. Stated differently, the disclosed systems, devices, and methods enable the feature control system to locally control a feature of an application, which is also locally executing on the computer system. As indicated above, both the feature control system and the application execute on the same computing infrastructure. By executing the feature control system on the same infrastructure as the application, the embodiments avoid or reduce latency and enable the feature control system for that application to be scalable independently of other instances of the feature control system for other applications or for other computing systems. As used herein, the term "instance" refers to a single installation of an application operating on a system. The embodiments also equip or configure the feature control system with intelligence to enable the system to determine when and how to control the application's features.

The disclosed embodiments bring about numerous benefits, advantages, and practical applications to the technical field of software application management, including feature control. Notably, this disclosure describes systems, methods, and devices that provide intelligent feature control and that are designed to harness the benefits of machine learning ("ML"). As described herein, ML can be used to better determine how to control an application's features (e.g., by selectively determining when and how to turn a feature on or off). ML is able to capture a plethora of data from any number of sources or events, including events such as A/B tests (e.g., a process in which multiple versions of a feature are provided to a set of users to determine which version produces favorable engagement, as will be described in more detail below). In embodiments, an ML engine analyzes the captured data to determine which application features to promote (e.g., encourage the use of, or to turn on) and which application features to demote (e.g., discourage the use of, or to turn off). By doing so, a user's ability to engage and interact with the application is improved.

The phrase "intelligent feature control" refers to a concept for dynamically controlling the features of an application. Intelligent feature control is designed to be a deployable solution for providing engineers, marketers, service operators, or, more broadly, administrators, with a toolset to quickly enable or disable the features of an application. Doing so allows the administrator to rollout or rollback features in a controlled and safe manner. Intelligent feature control can occur for any type of application, including ones hosted in the cloud.

The disclosed embodiments also enhance the functionality of the underlying application. Traditional methodologies retained a tight grip on access to their feature control systems. This grip impaired the ability of traditional feature control systems to adequately scale and also introduced cumbersome latency into the processes. Instead of operating in a remote manner where the control is centralized, the disclosed embodiments allow for the download of individual instances of a feature control system to each server of a cloud service. The effect of having a local version of the feature control system operating on the same infrastructure as where an application is operating is that the feature control system can dynamically scale with the application, and the feature control system will no longer (or at least to a reduced degree) experience network-based latency issues.

Because the feature control system disclosed herein is able to intelligently control an application's features, the feature control system will be able to determine which features are advancing the use or functionality of the application and which features are detracting from the use or functionality of the application. Such operations effectively improve the functionality of that application. Accordingly, these and numerous other benefits will now be described in more detail throughout the remaining portions of this disclosure.

Improved Computing Architecture for Hosting an Intelligent Feature Control System FIG. 1 shows an example improved technique for implementing a feature control system. FIG. 1 shows a cloud environment 100 that includes a server cluster 105 comprising any number of nodes or servers. The cloud environment 100 also includes a cloud service 110 that is shown as managing a feature control system 115. Use of a cloud service is only one example implementation and in alternative implementations the feature control system 115 is provided from other sources (e.g., enterprise servers or perhaps other peers).

In accordance with the disclosed principles, the embodiments cause an instance of feature control system 115 to be locally instantiated or installed onto a server, such as any of the servers in the server cluster 105, as shown by feature control system instance download 120. Stated differently, one or more servers in the server cluster 105 are permitted to execute an instance of an application. For each server that is executing an application instance, the embodiments cause that server to receive a downloadable version of feature control system 115. By downloading an instance of feature control system 115 locally onto the same computing infrastructure that is hosting the application, the feature control system now operates using the same computing resources as those used by the application. When the feature control system operates on the local machine, the feature control system now will not be faced with potential lagging or latency issues that may occur from communicating over a network connection.

Furthermore, the locally downloaded feature control system can dynamically scale based on the usage of the application on that machine. Even further, the load that is put on one instance of the feature control system will now have no influence on the load put on another instance of the feature control system on a different machine.

Figure 2:
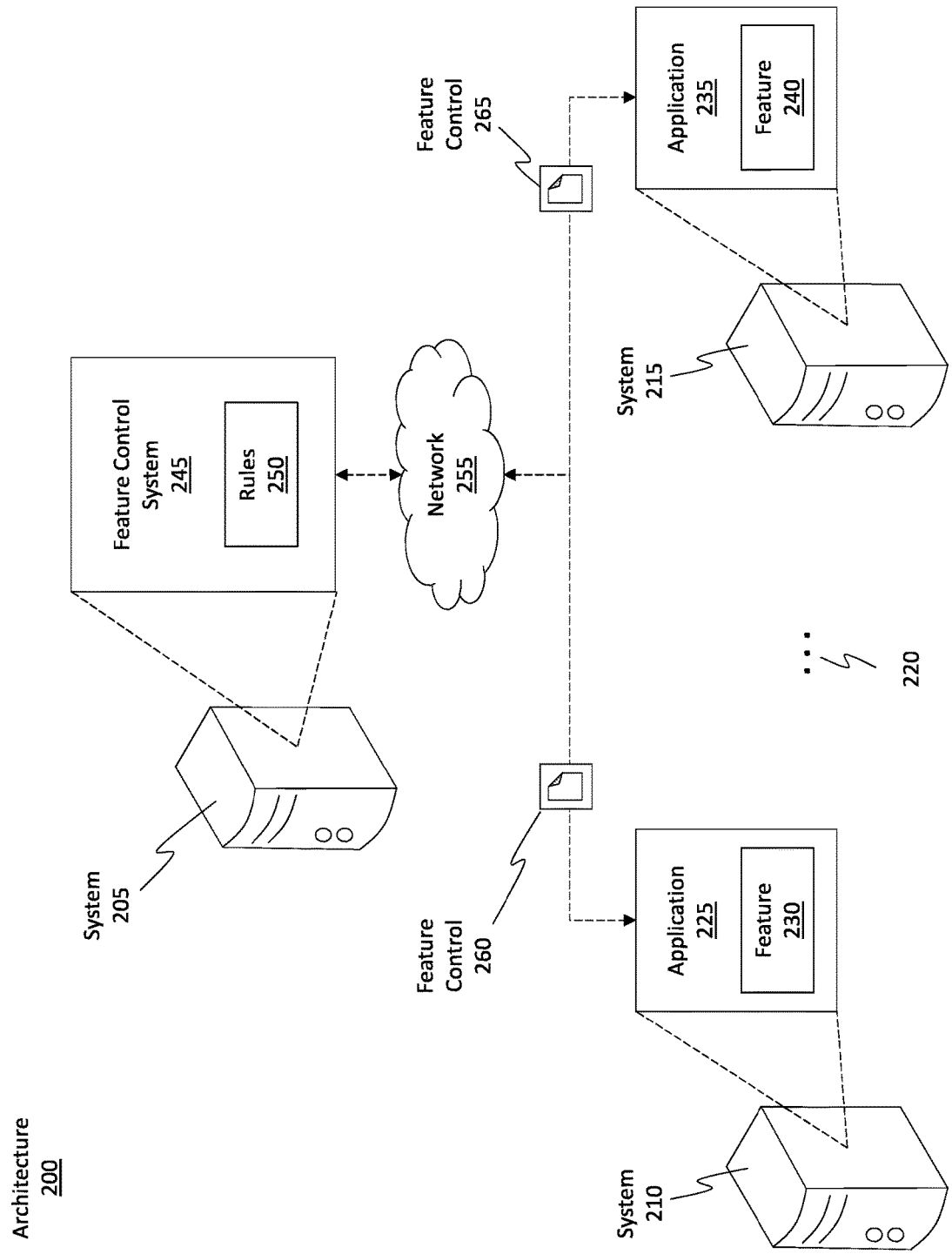
FIG. 2 illustrates an example architecture for performing remote-based feature control.

In contrast with traditional techniques, as will be shown in connection with FIG. 2, embodiments now provide control of a feature control system to a local machine. Previously, control was retained by the cloud service provider; now, however, each local server, node, application, or machine has control over that machine's feature control system. Control 125 reflects the control over the feature control system 115 previously had by the cloud service 110 whereas control 130 reflects the localized control each server has over its local instance of the feature control system. Thus, the control shifts from a global control scheme to a local control scheme.

FIG. 2 shows an example traditional architecture 200 for performing feature control. Architecture 200 is provided to facilitate a comparison against the new architecture shown in some of the various Figures.

In particular, architecture 200 is shown as including computer systems 205, 210, and 215. The ellipsis 220 demonstrates how any number of systems can be included in the architecture 200. System 210 includes an instance of an application 225 having a feature 230. System 215 includes a different instance of the application, as shown by application 235, also having a feature 240. In FIG. 2, applications 225 and 235 may be different instances of the same application. In some cases, feature 230 corresponds to feature 240. In other cases, feature 230 refers to a different feature than the one referenced by feature 240.

System 205 is shown as including a feature control system 245 that includes a set of rules 250 for determining how to control the features of the applications 225 and 235. Notice, in FIG. 2, the feature control system 245 is operating on a different computing infrastructure (e.g., system 205) than the infrastructure that is hosting the applications 225 and 235 (e.g., systems 210 and 215). System 205 passes communications over the network 255 to control the features 230 and 240. For instance, feature control 260 reflects a control, command, or instruction sent by the feature control system 245 over the network 255 to the application 225 to control the feature 230. Similarly, feature control 265 reflects a control, command, or instruction sent by the feature control system 245 over the network 255 to the application 235 to control the feature 240.

Constructing an architecture in which the feature control system is located remotely from the application(s) it services creates the problems that were mentioned earlier (e.g., latency, scalability). The new architecture shown in FIG. 1 thus presents an improved architecture designed to avoid those problems.

Figure 3:
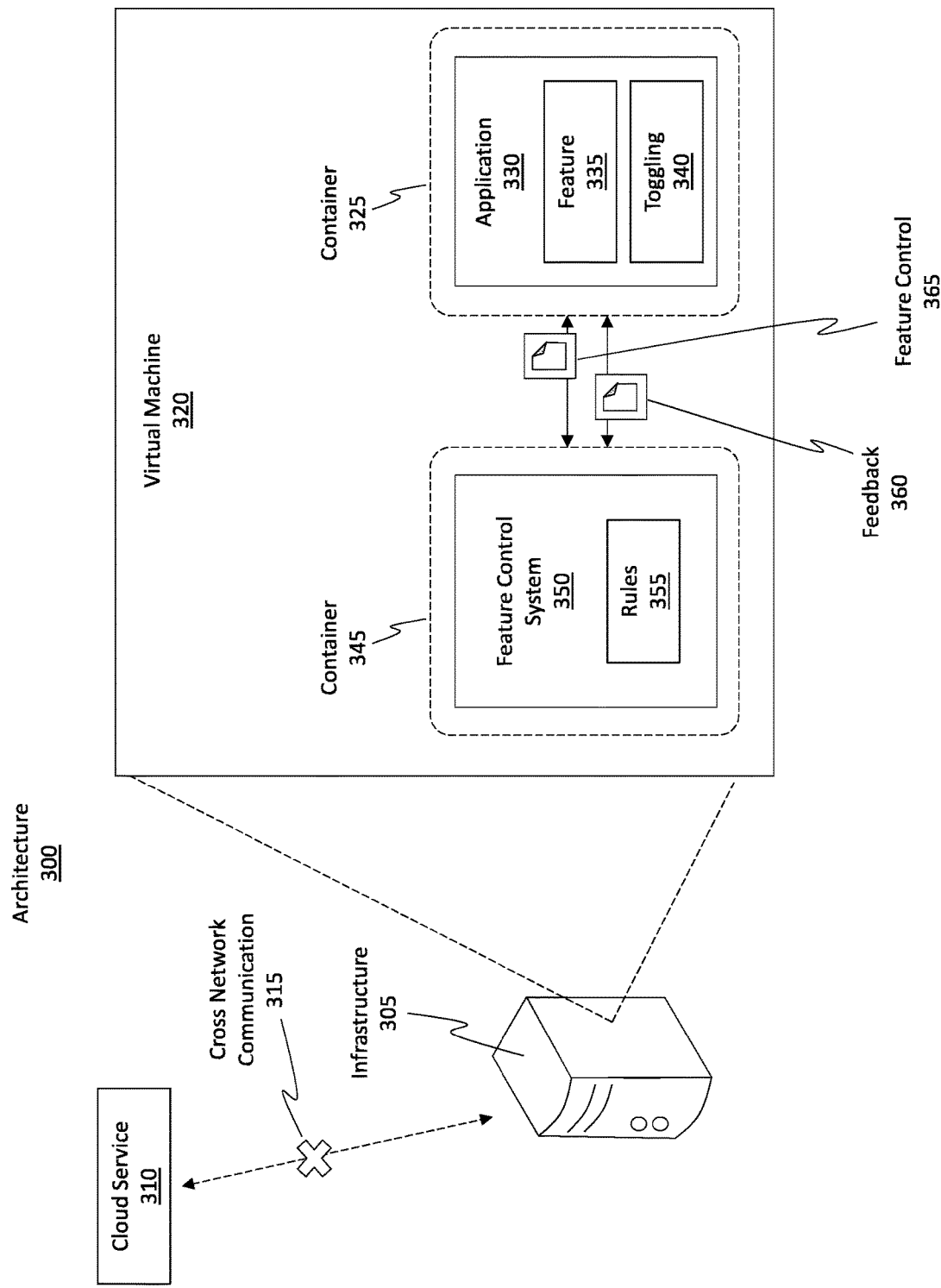
FIG. 3 illustrates an example architecture detailing how a feature control system can locally control an application's features.

FIG. 3 illustrates an example architecture 300 that is representative of the cloud environment 100 of FIG. 1. Architecture 300 includes a computing infrastructure 305, which can represent any of the servers in the server cluster 105. Architecture 300 also shows a cloud service 310, which is representative of the cloud service 110.

In this scenario, the infrastructure 305 has already received a downloadable instance of the feature control system. In some cases, the downloadable instance was received from the cloud service 310 while in other cases the downloadable instance was received from a different repository. As a result, the infrastructure 305 need not maintain or facilitate cross-network communication 315 with the cloud service 310 as to communications relating to the feature control system. Stated differently, the infrastructure 305 now has a local instance of the feature control system, so the infrastructure 305 is not required to receive instruction or commands from the cloud service with regards to one, some, or perhaps all operations of the feature control system.

That is not to say that the infrastructure 305 will no longer communicate with the cloud service 310; rather, the infrastructure 305 is able to make local decisions as to how to control features. Thus, the "x" corresponding to the cross-network communication 315 should not be viewed as being a complete termination of all communications between the infrastructure 305 and the cloud service 310; rather, communications may still occur. Instead, the "x" should be viewed as now there is a scenario where the infrastructure 305 performs local control over the features of an application instead of receiving remote commands with regard to that control. It should also be noted how in some cases, there may be a global rollout or rollback of some features, and the infrastructure 305 can still receive that instruction from the cloud service 310.

In any event, infrastructure 305 is shown as hosting a virtual machine ("VM") 320. This VM is shown as including a container 325 comprising an application 330, which has a feature 335 that can be toggled on or off, as shown by toggling 340. In addition to turning a feature on or off, the control of a feature also includes upgrading a feature to a new version and/or rolling the feature back to an older version. As used herein, the term "container" refers to a software package that contains the various components needed to run an application in any computing environment, even across different operating systems. Thus, a container operates to virtualize the application to enable that application to run on any infrastructure or operating system.

In some cases, the virtual machine 320 may include another container 345 comprising the downloaded instance of the feature control system 350. Thus, in some scenarios, the feature control system 350 may reside in a container that is different from the container in which the application resides. As will be described in more detail later, in some scenarios, the feature control system and the application may reside in the same container.

Feature control system 350 is shown as including a set of rules 355. Rules 355 are used to govern the control of the feature 335, such as whether the feature 335 is turned on, turned off, active, inactive, supplemented, or perhaps even removed from the application 330. Rules 355 can thus be viewed as policy. Notice, the rules 355 are also downloaded on the infrastructure 305. In some instances, supplements or updates to the rules 355 can be periodically downloaded from the cloud service 310. The execution of the rules 355 thus occurs on the same infrastructure 305 as where the application 330 is executing. In some implementations, the rules 355 are generated or supplemented by a local user of the virtual machine 320.

FIG. 2, on the other hand, presented a scenario where the consideration of the rules 250 occurred on different infrastructure than the infrastructure where the applications were executing. As shown in FIG. 2, a command was issued over a network connection to a remote system to facilitate the implementation of the rules 250.

In FIG. 3, the feature control system 350 is able to receive feedback 360 regarding usage of the feature 335. As one example, the feedback 360 can be obtained from an A/B test (to be discussed in more detail below) of which the application 330 is a part. In another scenario, the feedback 360 can include any form or type of metric data, telemetry data, usage data, or even data from an external, third-party source (e.g., a public forum discussing the feature 335).

Based, at least in part on the feedback 360, the feature control system 350 can then send a local feature control 365 command to the application 330. This command causes the application 330 to turn the feature 335 on or off, or to execute some level of control over the feature 335 in some other manner (e.g., by supplementing the feature 335, augmenting the feature 335, or removing the feature 335 from the application 330).

Figure 4:
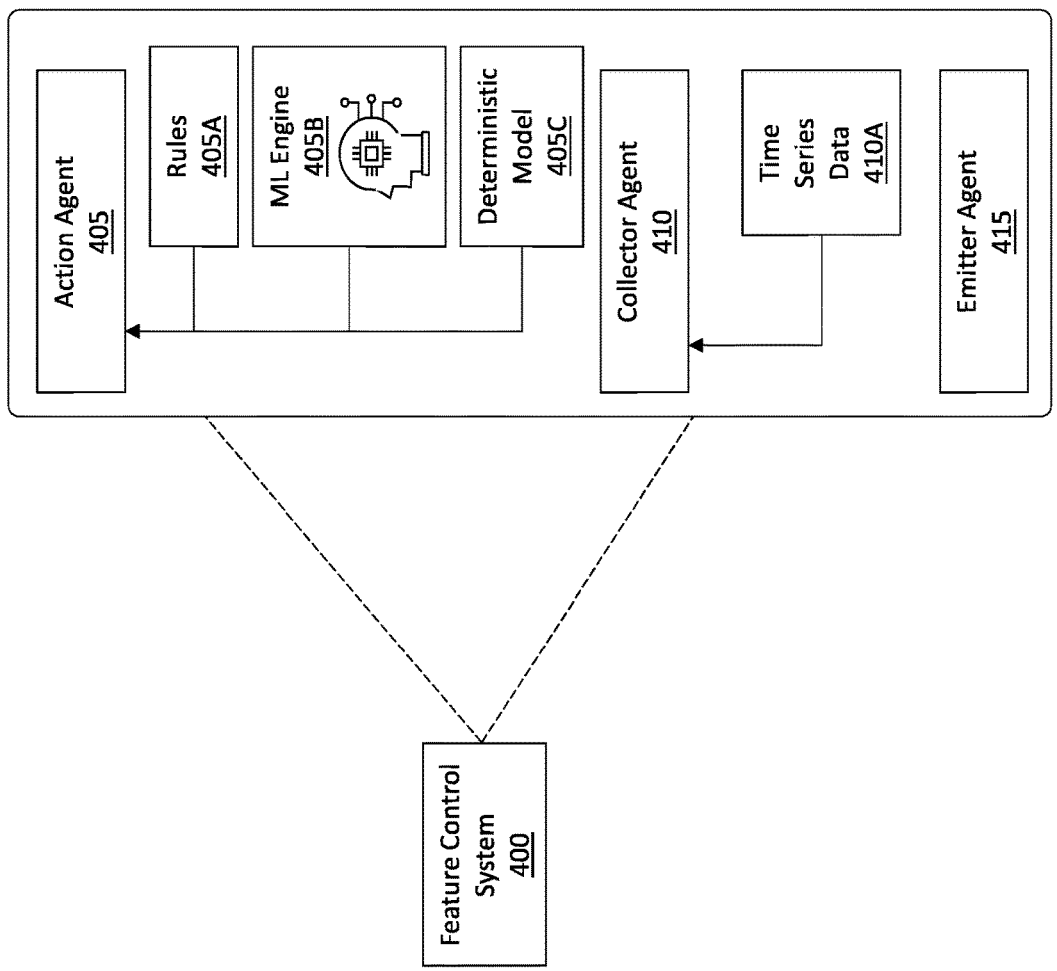
FIG. 4 illustrates further details regarding an example feature control system.

FIG. 4 shows a feature control system 400, which is representative of the feature control system 350 of FIG. 3. In some embodiments, feature control system 400 relies on a series of standalone agents (e.g., executable processes) that are used (i) to collect telemetry data and metrics from inside and/or outside data sources, (ii) to perform various actions (e.g., turn a feature on or off, or perform version control on a feature, or other actions are discussed in more detail below), and (iii) to export generated or transformed data out for other agents to use. Stated differently, agents can perform one or any combination of the following functions: (i) collect data from sources, (ii) perform an action based on the collected data, and/or (iii) emit data back out for logging or for another agent to process. FIG. 4 shows an action agent 405, a collector agent 410, and an emitter agent 415.

The feature control system 400 provides responses back to the end-users or other systems using the action agent 405. The action agent 405 is a program or process that takes defined rules 405A as well as data from the collector agent 410 and that then performs actions as needed. One action includes toggling the state of an application's features. As used herein, a feature's "state" should be interpreted broadly. As a general example, this state can include an "on" or "active" state (e.g., meaning that the feature is surfaced to the user or application, and is usable by the user or application), an "off" or "inactive" state (e.g., meaning that the feature is not currently usable), or any other programmatically available state.

The action agent 405 can execute code on a predefined schedule (e.g., every 5 minutes). The action agent 405 can also be reactive to data changes triggered by the collector agent 410. The action agent 405 can optionally read the defined rules 405A to determine what to do with the collected data.

In some cases, the action agent 405 includes an ML engine 405B that is tasked with applying the rules 405A to the collected data. The ML engine 405B can operate even when faced with a randomization factor, which refers to a potentially unanticipated or uncontrollable confounding variable.

As used herein, "machine learning" or "artificial intelligence" includes any type of machine learning algorithm or device, convolutional neural network(s), multilayer neural network(s), recursive neural network(s), deep neural network(s), decision tree model(s) (e.g., decision trees, random forests, and gradient boosted trees), linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

In some cases, the action agent 405 includes a deterministic model 405C. Unlike the ML engine 405B, which can operate even when faced with the randomization factor, the deterministic model 405C computes results exactly, such that the outcome is determined using a complete set of data and is determined with certainty.

The rules 405A can be executed or implemented by the ML engine 405B and/or by the deterministic model 405C. For instance, the deterministic model 405C can apply discrete logic in an if-this-then-that type of rule scenario (e.g., if metric X exceeds value Y, then disable feature Z). Additionally, or alternatively, the ML engine 405B can be used to detect outliers or anomalies in the collected data to determine when or if a feature is to be disabled. Additionally, output or computed values from the action agent 405 can be emitted out for the collector agent 410 to store for later computation.

Figure 5:
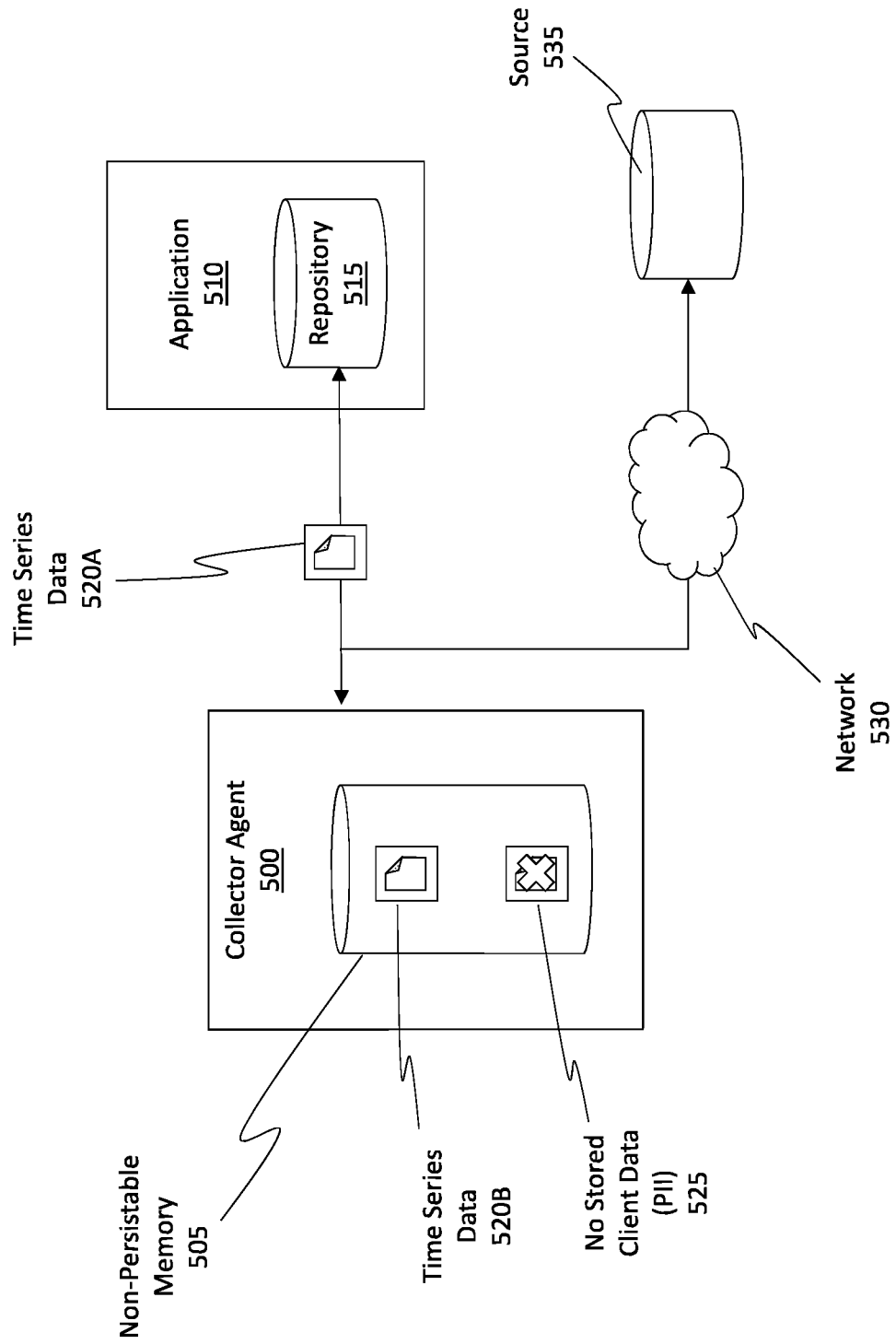
FIG. 5 illustrates how the example feature control system is able to collect data describing the various operations, usage, or other factors of the application to determine when and how to control a feature of that application.

Regarding the collector agent 410, the feature control system 400 can include a collection of processes dedicated to pulling data from a variety of data sources, including sources internal to or directly associated with (e.g., can be accessed via an application call from the application to the source) an application and sources that are external, remote, or indirect relative to the application (e.g., by network communication calls). Custom events can also be obtained from external sources, such as any type of social media platform, repository, and so forth. The data is collected by the collector agent 410. Optionally, the data can be in the form of time series data 410A, which has a time component. The data can be stored in a database as the time series data 410A to be consumed by the action agent 405. FIG. 5 provides some additional details.

FIG. 5 shows an example collector agent 500, which is representative of the collector agent 410 of FIG. 4. In this scenario, collector agent 500 includes or has access to non-persistable memory 505 to temporarily store the data it collects. For instance, the collector agent 500 can communicate with the application 510, which includes or has access to a repository 515 of client data, application usage data, telemetry data, or any other performance or other data relevant to the application 510. The collector agent 500 collects time series data 520A describing the application 510 and describing the information included in the repository 515.

Collector agent 500 stores the time series data in the non-persistable memory 505, as shown by time series data 520B. Notably, in some embodiments, collector agent 500 does not store actual, recognizable client data or personally identifiable information ("PII"), as shown by no stored client data ("PII") 525.

Collector agent 500 can also obtain time series data from other sources beyond that of the application 510. For instance, collector agent 500 can communicate over a network 530 with a different source 535 to obtain metric data related to the application 510. As a specific example, suppose the source 535 is a public forum where users can rate or comment on the features of an application. Collector agent 500 can access that forum, collect the data pertaining to the application 510, and then pass the data to the action agent to determine how to control the feature mentioned in the forum's comments.

Figure 6:
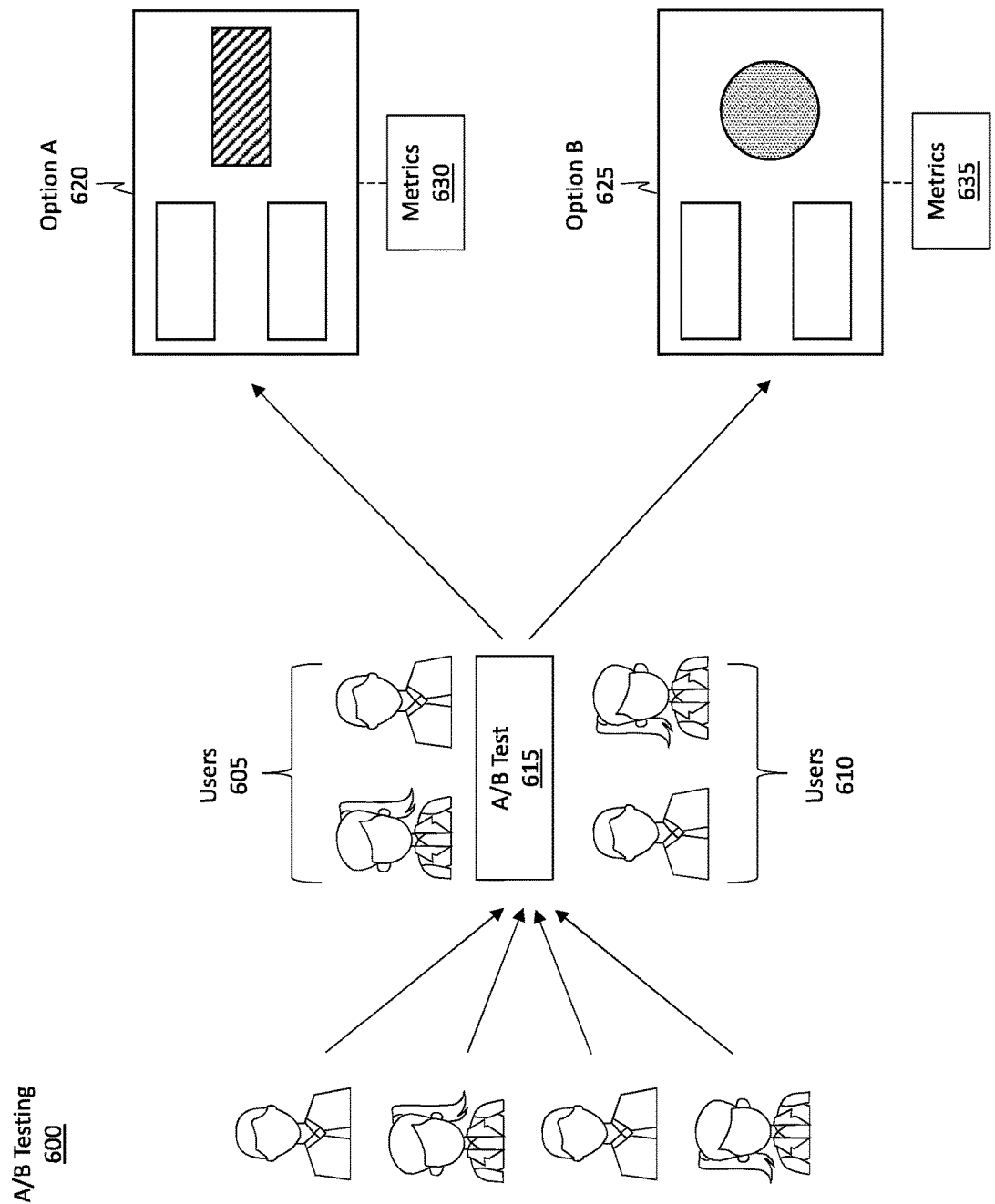
FIG. 6 illustrates an example technique for collecting data about an application's features.

FIG. 6 illustrates one example technique for collecting data, including any type of metric data and even time series data. FIG. 6 focuses on an example of A/B testing 600, which can optionally be implemented by the collector agent 500 of FIG. 5.

As mentioned previously, A/B testing refers to a process in which two (or perhaps more) versions of a feature are provided to a set of users. A first set of users is provided with the "A" version of the feature, and the second set of users is provided with the "B" version of the feature. The test collects data to see which version of the feature has a bigger impact on its respective set of users. The data is then used to drive various business decisions and, perhaps, even to drive the evolution of the feature and application. FIG. 6 is representative.

FIG. 6 shows a first set of users 605 and a second set of users 610 involved in an A/B test 615, which is testing the popularity, use, or influence of an application feature with respect to the test group. For instance, the first set of users 605 are provided with an option A 620 version of a feature (e.g., represented by the shaded rectangle) for an application. The second set of users 610 are provided with an option B 625 version of the feature (e.g., represented by the shaded circle) for the application. The A/B test 615 includes a metric tracker to track the metrics regarding those options, as shown by metrics 630 for option A 620 and metrics 635 for option B 625. The A/B test 615 will determine which option A or B was used more often or had a bigger impact on the users or was preferred by the users. Optionally, the metric information can be provided to a feature control system, which may then be tasked with rolling out the most impactful version of the feature to the various applications that have the feature. Thus, A/B testing can be used by a feature control system to determine when and how to control an application's features.

Returning to FIG. 4 and regarding the emitter agent 415, the emitter agent 415 can be a process that directly emits data directly back to the collector agent 410, the action agent 405, or another agent for processing by that agent. The action agent 405 may then emit an action such as disabling a feature. The collector agent 410 might use the data for other computations. The emitted data can also be used to facilitate a direct communication between the end-user's service or application and the feature control system 400. One example scenario could involve the action agent 405 doing outlier detection and emitting back the outlier result for discreet logic to determine if a feature is to be enabled or disabled. Another example scenario could involve the end-user application directly emitting data when a consumer logs in or performs some action.

As mentioned previously, different instances of a feature control system are downloaded onto different servers. Those respective instances can then operate in a focused manner to control the features for the application(s) hosted by the same server hosting the feature control system. One result of this implementation is that the applications across different platforms or machines will have a diversity of features. Optionally, multiple instances can be downloaded onto the same hardware, and each instance may service a different application.

Figure 7:
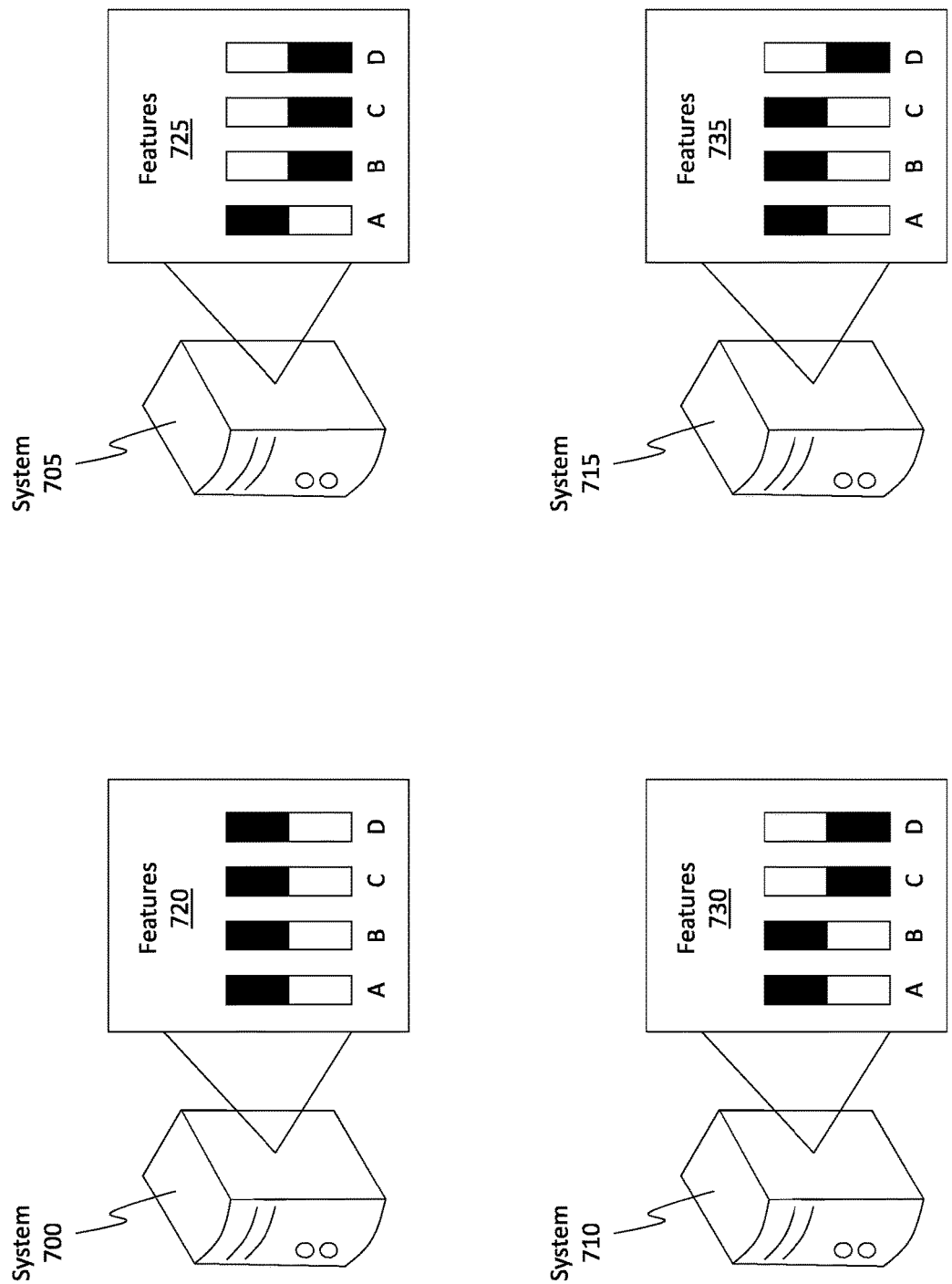
FIG. 7 illustrates how different features can be controlled using local instances of an example feature control system.

FIG. 7 shows four systems, namely, systems 700, 705, 710, and 715. Each of these systems are operating in the manner where a locally instantiated/downloaded feature control system is locally controlling the features of an application that is operating on the same system.

FIG. 7 shows a set of features 720 for an application operating on the system 700. Features 720 include an A feature, a B feature, a C feature, and a D feature. In this scenario, all four features are currently turned on for that application on system 700.

Features 725 on system 705 have a different configuration, however. In this example scenario, only feature A is turned on; features B, C, and D are turned off. For features 730 on system 710, features A and B are turned on, and features C and D are turned off. For features 735 on system 715, features A, B, and C are turned on, and feature D is turned off. Thus, the embodiments allow for localized control of an application's features.

Figure 8:
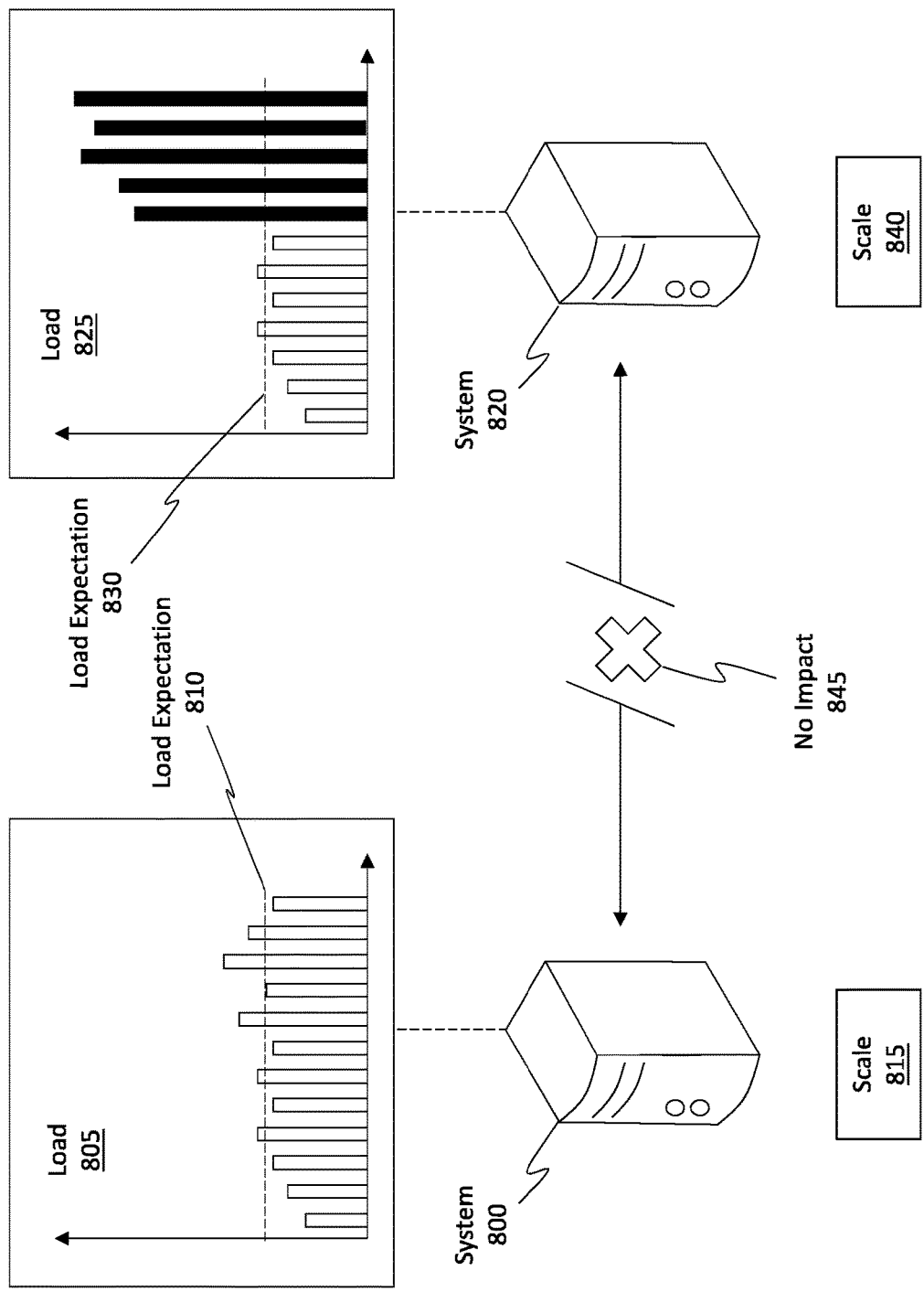
FIG. 8 illustrates the scalability of the example feature control system.

One benefit of enabling local control of an application's features deals with scalability, as shown in FIG. 8. FIG. 8 shows a system 800, which is representative of any of the systems, infrastructures, or servers mentioned thus far. System 800 locally implements an application and a feature control system. FIG. 8 shows a load 805 for the application as well as a load expectation 810 for that application. The feature control system can scale 815 its processes to accommodate the load and load expectation.

FIG. 8 shows a different system 820, which also executes an application and a feature control system. FIG. 8 shows a load 825 for the application as well as a load expectation 830 for that application. In this scenario, the load on the application has recently significantly increased. In accordance with the disclosed principles, the embodiments are able to enable the feature control system to dynamically scale 840 to the load of the application it is managing. Furthermore, the scaling or operations performed by the feature control system on the system 800 have no impact 845 on the scaling or operations performed by the feature control system on the system 820. By "scale" or "scaling," it is meant that a modified amount of processor time, memory availability, and/or computer resource availability is allotted to the feature control system.

Additional Configurations

Figure 9:
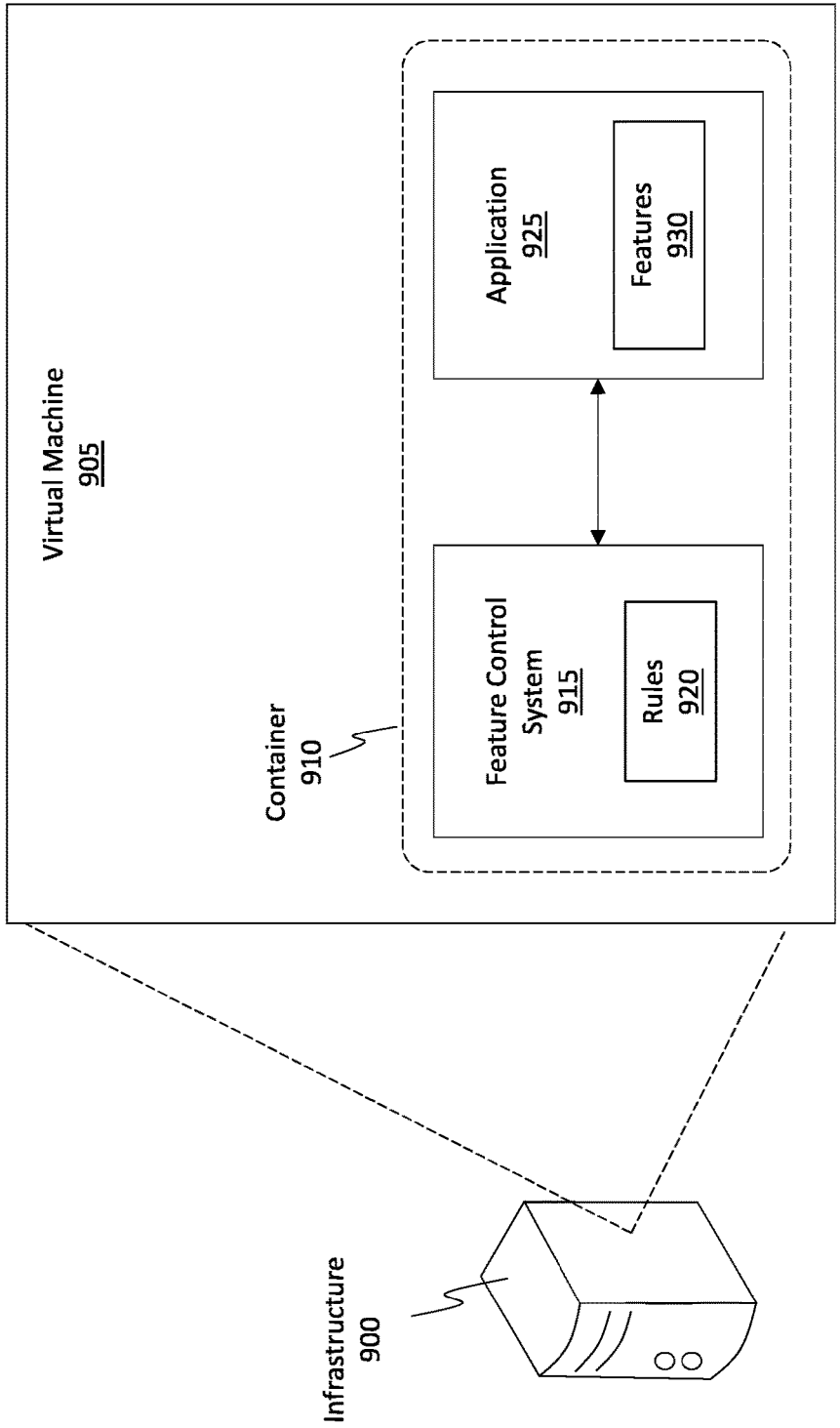
FIG. 9 illustrates another example embodiment of the disclosed feature control system.

FIG. 9 shows an example infrastructure 900 hosting a virtual machine 905. In this example, the virtual machine 905 is shown as hosting a container 910. Notice, container 910 includes a feature control system 915, with its accompanying rules 920, and application 925, with its accompanying features 930. Thus, in some implementations, a single container can include both an application and a feature control system.

Figure 10:
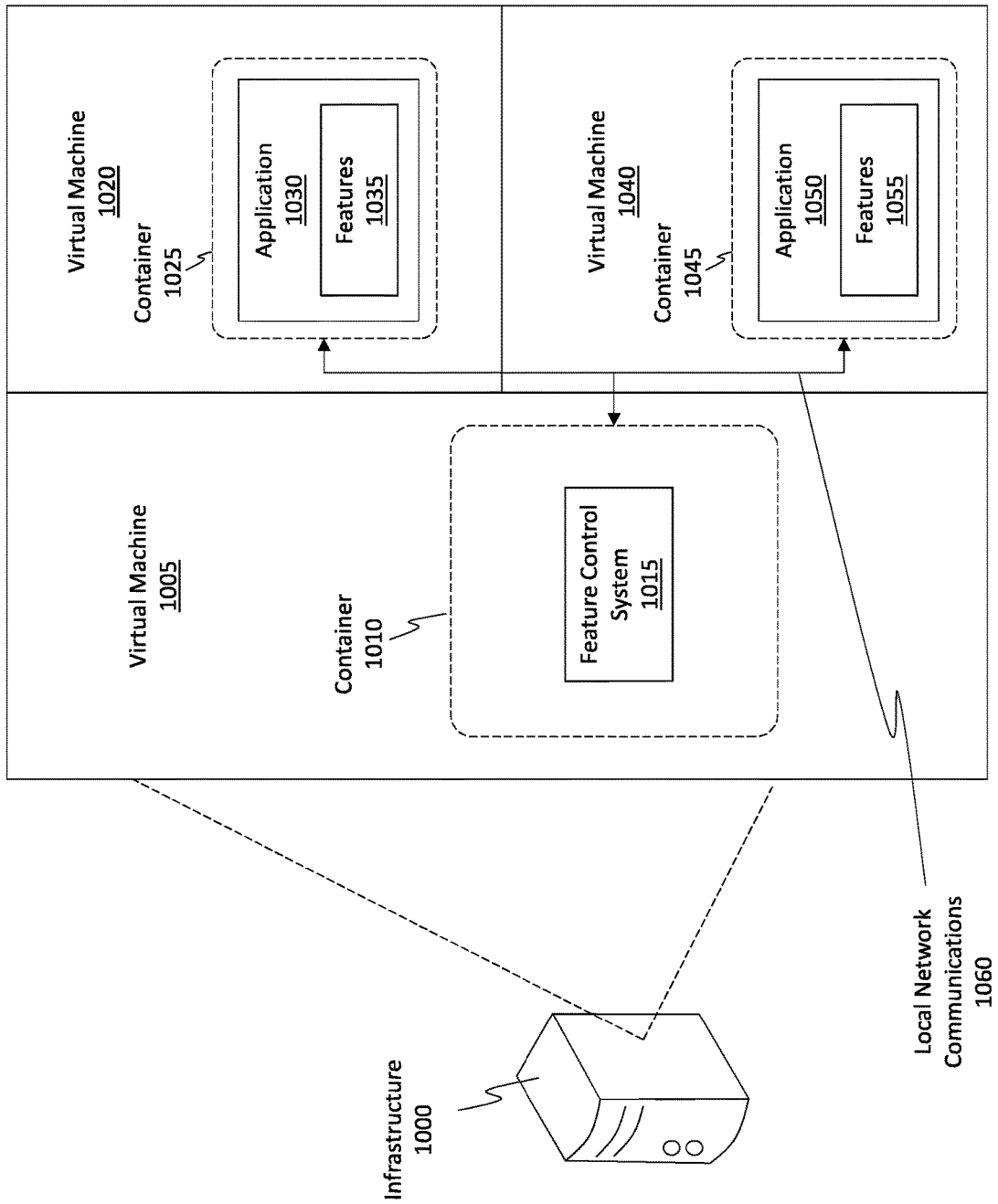
FIG. 10 illustrates another example embodiment of the disclosed feature control system.

FIG. 10 shows an infrastructure 1000 hosting a first virtual machine 1005. Virtual machine 1005 is hosting a container 1010 comprising a feature control system 1015. Infrastructure 1000 is hosting a second virtual machine 1020, which itself is hosting a container 1025. Container 1025 includes an application 1030 with features 1035. Infrastructure 1000 is shown as hosting yet another virtual machine 1040, which itself is hosting a container 1045. Container 1045 includes an application 1050 with features 1055.

Despite the feature control system 1015 residing in a different container and even in a different virtual machine than the virtual machines hosting applications 1030 and 1050, the feature control system is able to control the features for those applications by issuing local network communications 1060 to facilitate the control of those features.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 11:
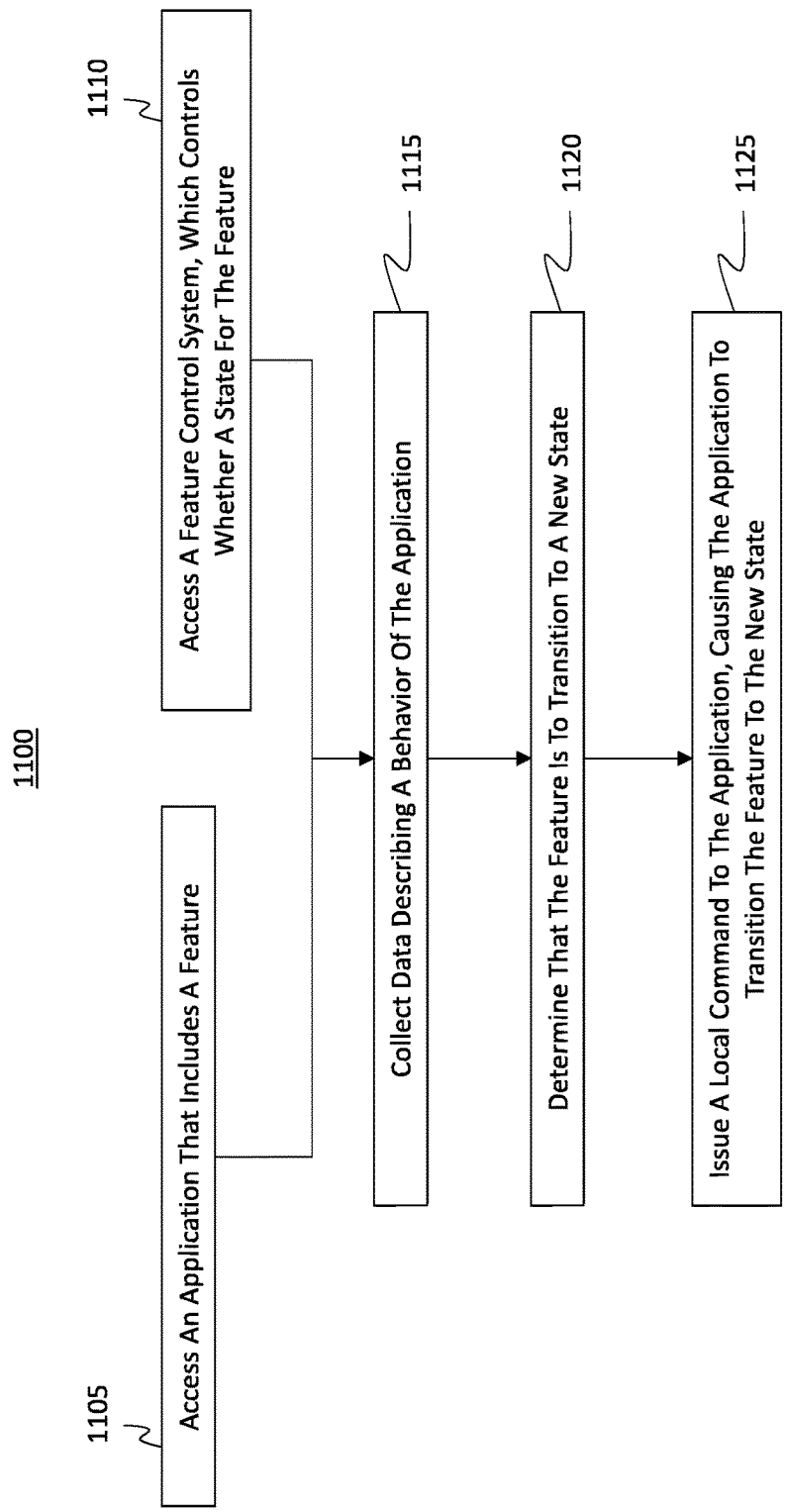
FIGS. 11, 12, and 13 illustrate various different flowcharts of example methods for locally instantiating and implementing a feature control system.

Attention will now be directed to FIG. 11, which illustrates a flowchart of an example method 1100 for locally executing a feature control system on a computer system and for enabling the feature control system to locally control a feature of an application, which is also locally executing on the computer system, such that both the feature control system and the application execute on a same infrastructure of the computer system. Method 1100 can be implemented in the cloud environment 100 of FIG. 1, the architecture 300 of FIG. 3, the infrastructure 900 of FIG. 9, or in the infrastructure 1000 of FIG. 10.

Method 1100 includes an act (act 1105) of accessing an application that includes a feature. For instance, the embodiments can access the application, which includes the feature. The feature can have a first state (e.g., an "on" state, an "active" state, an "off" state, an "inactive" state) during an initial usage of the application. In some cases, the state can also refer to a version of the application.

Act 1110 can be performed in parallel or in serial with act 1105. Act 1110 includes accessing a feature control system, which controls the state of the feature. For instance, the embodiments can access the feature control system, which controls whether the feature is to continue to have the first state or is to transition to having a second state. As an example, the feature might currently have an "on" state. The feature control system can determine whether the feature is to transition to having an "off" state or whether the feature is to transition to a different version. Stated differently, the first state can be an on state, and the second state can be an off state. As another example, if the feature is related to the visual appearance of a user interface element, then the feature might transition from a first visual appearance to a different visual appearance.

In some implementations, the feature control system is hosted by a first container, and the application is hosted by a second container. In some implementations, both the feature control system and the application are hosted by the same, first container. Optionally, the application can be hosted by a first VM. The feature control system can also be hosted by the first VM. In some cases, the feature control system is hosted by a second VM.

Act 1115 includes collecting data describing the behavior of the application. For example, the embodiments can collect metric data describing the application's behavior and/or describing other data associated with the application (e.g., perhaps a forum review of the application, including the application's feature).

Act 1120 includes a determination that the feature is to transition to a new state. For example, the embodiments can determine, based on the metric data describing the application's behavior, that the feature is to transition to having the second state.

Act 1125 includes issuing a local command to the application, thereby causing the application to transition the feature to the new state. For example, the embodiments can use the feature control system to issue a local command to the application, where the local command causes the application to transition the feature from having the first state to having the second state. In some cases, the feature control system is provided permissions from the application to enable the feature control system to directly modify the feature, or rather, the state of that feature. Thus, in some embodiments, the feature control system instructs the application to make the change to the feature while in other embodiments the feature control system itself makes the change to the feature.

Optionally, the feature control system includes an ML engine. The ML engine can analyze the metric data and detect an anomaly in the metric data. The ML engine can also determine that the feature is to transition from the first state to the second state based on the detected anomaly.

Figure 12:
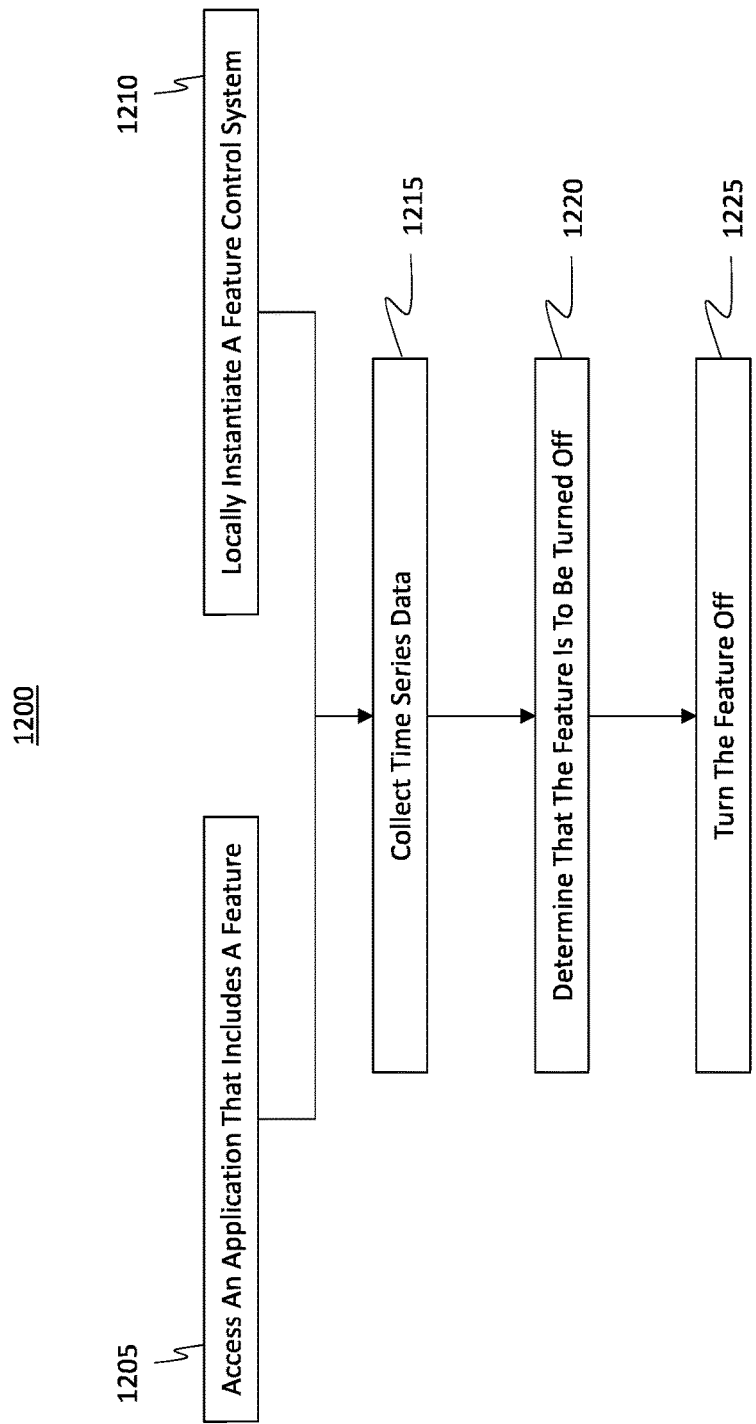

FIG. 12 shows a flowchart of an example method 1200 for locally instantiating a feature control system and for enabling the locally instantiated feature control system to control a feature of an application, which is also executing on the computer system, such that both the feature control system and the application execute on a same infrastructure of the computer system. Method 1200 can be implemented in the cloud environments, architectures, systems, and servers mentioned herein.

Method 1200 includes an act (act 1205) of accessing an application that includes a feature. The feature is currently turned on, such that the feature is available for use. The application also manages a database of information describing the state of the application.

The feature can be a variety of things. For instance, in one embodiment, the feature is one of: a visual appearance of a user interface element of the application or a function that is performed by the application.

Act 1210 can be performed in parallel or in series with act 1205. Act 1210 includes locally instantiating a feature control system that controls whether the feature is turned on or is turned off. By "locally instantiating," it is meant that an instance of the feature control system is locally downloaded to a server, system, or infrastructure, and the feature control system now operates locally on that system. The feature control system can include a rule or a set of multiple rules used to govern the control of the feature.

Act 1215 includes collecting or accessing time series data describing the information included in the database. In some embodiments, the time series data omits personal identifiable information ("PII") related to a client of the application. Also, the time series data can be stored in non-persistable memory.

Act 1220 includes determining, based on the time series data, that the feature is to be turned off. For instance, the feature control system can determine that the feature is to be turned off based on an implementation of the rule to the time series data.

Act 1225 includes causing the feature control system to instruct the application to turn the feature off. As a result, the feature is no longer available for use.

In some embodiments, the feature control system scales with the state of the application or with the load of the application. For instance, as the application's state or load changes, the feature control system can scale accordingly.

Figure 13:
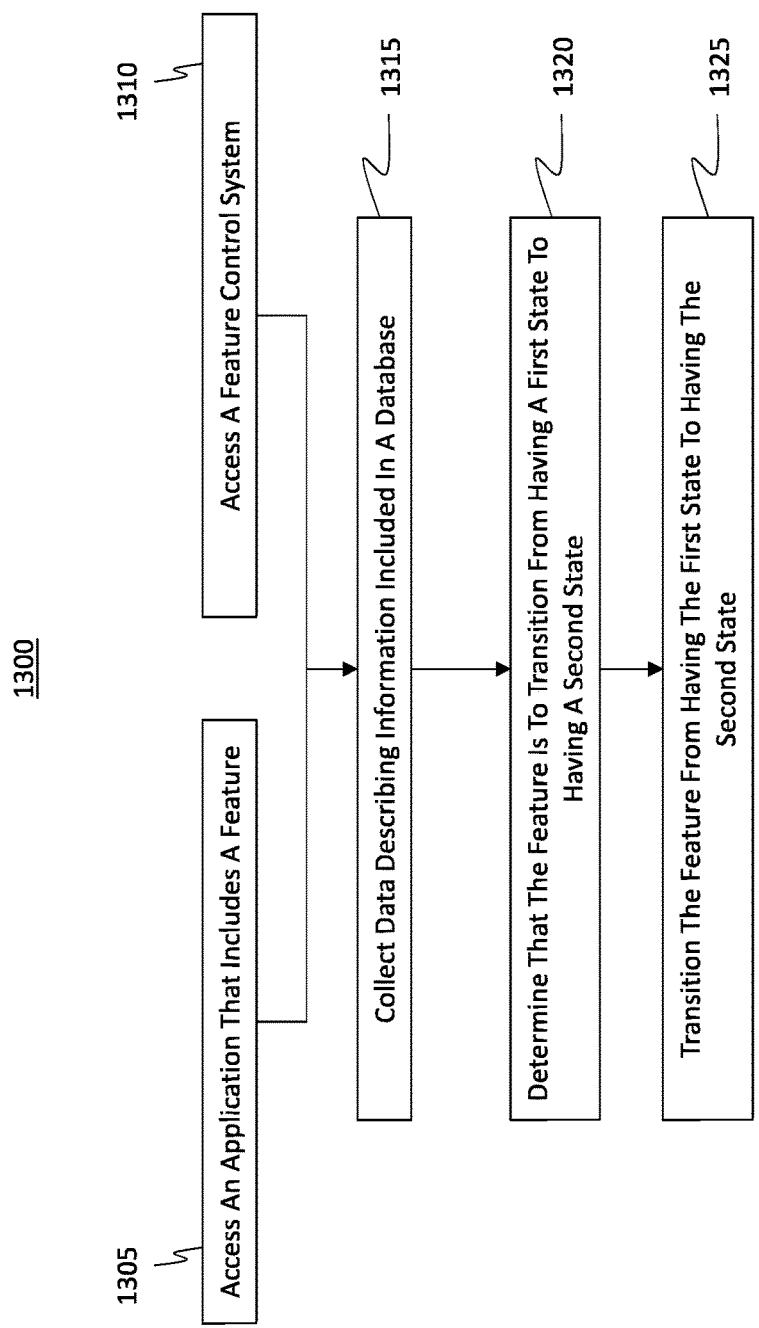

FIG. 13 illustrates a flowchart for an example method 1300 for locally instantiating a feature control system on a computer system and for enabling the locally instantiated feature control system to control a feature of an application, which is also executing on the computer system, such that both the feature control system and the application execute on a same infrastructure of the computer system. Method 1300 can also be implemented in the environments, systems, servers, and architectures described herein.

Method 1300 includes an act (act 1305) of accessing an application that includes a feature. This feature currently has a first state. The application also manages a database of information associated with the application.

Act 1310 includes locally instantiating or accessing a feature control system that controls whether the feature has the first state or has a second state. The feature control system can include a deterministic model. The feature control system can also include an ML engine. The feature control system and the application can be hosted by the same container or can be hosted in different containers.

Act 1315 includes collecting or accessing data describing information included in the database. For instance, the embodiments can cause the feature control system to collect data describing the information included in the database. The feature control system can also collect additional data from a source other than the application's database. As one example, the source can be a social media service or platform. The collected data can include one of time series data, local telemetry data, business metric data, or network usage data.

Act 1320 includes determining that the feature is to transition from having the first state to having a second state. For instance, the embodiments can cause, based on the data, the feature control system to determine that the feature is to transition from having the first state to having the second state. The feature control system's deterministic model can include logic for determining that the feature is to transition from having the first state to having the second state. The ML engine can also include logic to determine when and how the feature is to transition. Optionally, the embodiments also allow for a user to manually trigger the feature to switch states.

Act 1325 includes transitioning the feature from having the first state to having the second state. For instance, the embodiments can cause the feature control system to instruct the application to transition the feature from having the first state to having the second state.

Accordingly, the disclosed embodiments are related to an intelligent feature control system. The feature control system can operate in conjunction with various A/B testing to determine when and how features are to be controlled. Beneficially, the disclosed feature control systems can operate as local services that run alongside an application, thus eliminating scaling and latency issues. The disclosed feature control systems can also beneficially monitor disparate data sources and can leverage machine learning and artificial intelligence to automatically determine if a feature should be toggled.

Example Computer/Computer Systems

Figure 14:
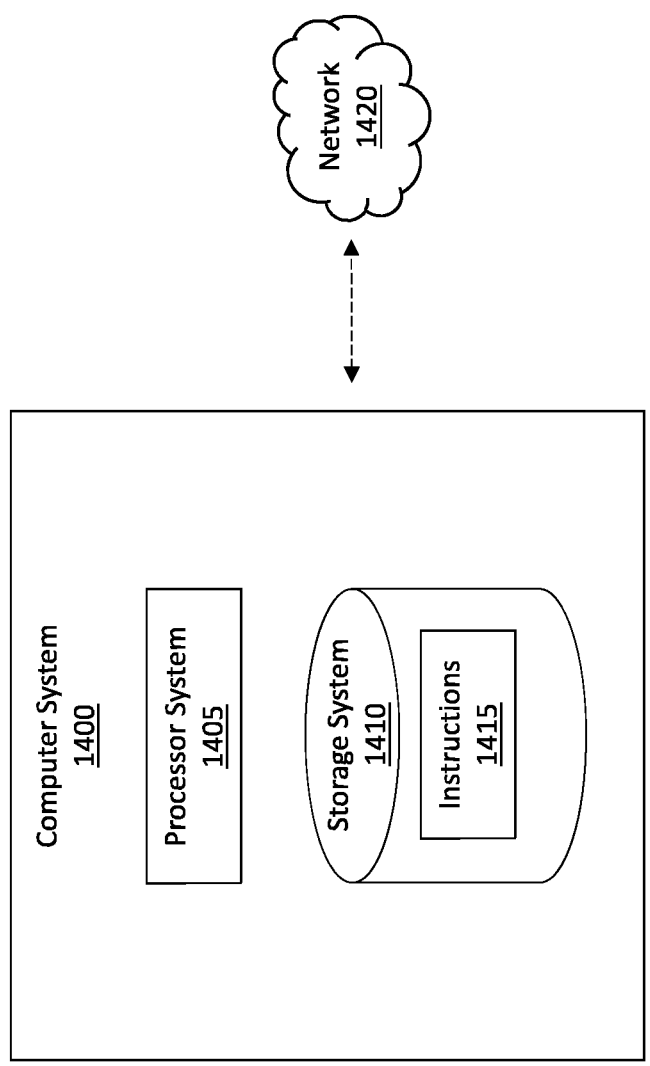
FIG. 14 illustrates an example computer system capable of performing any of the disclosed operations.

Attention will now be directed to FIG. 14 which illustrates an example computer system 1400 that may include and/or be used to perform any of the operations described herein. For instance, computer system 1400 can reflect any of the servers, systems, or infrastructures described herein. Computer system 1400 may take various different forms. For example, computer system 1400 may be embodied as a tablet, a desktop, a laptop, a mobile device, or a standalone device, such as those described throughout this disclosure. Computer system 1400 may also be a distributed system that includes one or more connected computing components/devices that are in communication with computer system 1400.

In its most basic configuration, computer system 1400 includes various different components. FIG. 14 shows that computer system 1400 includes a processor system 1405 comprising any number of processors (aka a "hardware processing unit") and storage system 1410 comprising any number of hardware storage devices.

Regarding the processor(s), it will be appreciated that the functionality described herein can be performed, at least in part, by one or more hardware logic components. For example, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage system 1410 may include physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage system 1410 is shown as including executable instructions 1415. The executable instructions 1415 represent instructions that are executable by the processor(s) of the processor system 1405 to perform the disclosed operations, such as those described in the various methods.

The disclosed embodiments may comprise or utilize a special-purpose or general-purpose computer including computer hardware, such as, for example, one or more processors (e.g., included in the processor system 1405) and system memory (e.g., included in the storage system 1410), as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example, the current embodiments can comprise at least two distinctly different kinds of computer-readable media: computer storage media and transmission media.

Computer storage media (aka "hardware storage device") are computer-readable hardware storage devices, such as random access memory ("RAM"), read-only memory ("ROM"), electrically erasable programmable read-only memory ("EEPROM"), compact disk read-only memory ("CD-ROM"), solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network.

Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card (NIC)) and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

When introducing elements in the appended claims, the articles "a," "an," "the," and "said" are intended to mean there are one or more of the elements. The terms "comprising," "including," and "having" are intended to be inclusive and mean that there may be additional elements other than the listed elements. Unless otherwise specified, the terms "set," "superset," and "subset" are intended to exclude an empty set, and thus "set" is defined as a non-empty set; "superset" is defined as a non-empty superset; and "subset" is defined as a non-empty subset. Unless otherwise specified, the term "subset" excludes the entirety of its superset (i.e. the superset contains at least one item not included in the subset). Unless otherwise specified, a "superset" can include at least one additional element, and a "subset" can exclude at least one element.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computer system, the method comprising:
   the computer system accessing an application that includes a feature, wherein the feature has a first state during an initial usage of the application, wherein the computer system hosts the application;
   the computer system accessing a feature control system, which controls whether the feature is to continue to have the first state or is to transition to having a second state, wherein the computer system hosts the feature control system such that a same computing infrastructure that hosts the application also hosts the feature control system, wherein the application is executing on a first virtual machine (VM) or within a first container, and wherein the feature control system is executing on a second VM or within a second container such that the feature control system is executing on the computer system externally relative to the application while still using the same computing infrastructure;
   the computer system collecting metric data describing a behavior of the application;
   in response to the computer system analyzing the metric data, the computer system detecting an anomaly in the metric data;
   based on the metric data and the detected anomaly, the computer system determining that the feature is to transition from the first state to the second state; and
   the computer system using the feature control system to issue a local command to the application, wherein the local command causes the application to transition the feature from having the first state to having the second state.

2. The method of claim 1, wherein the first state is one of an on state or a first version, and wherein the second state is one of an off state or a second version.

3. The method of claim 1, wherein the feature control system is hosted by the second container.

4. The method of claim 3, wherein the application is hosted by the first container.

5. The method of claim 3, wherein the application is hosted by the first VM.

6. The method of claim 1, wherein the application is hosted by the first VM.

7. The method of claim 6, wherein the feature control system is hosted by the second VM.

8. The method of claim 6, wherein the feature control system is hosted by the second container.

9. A computer system that locally implements a feature control system and that enables the feature control system to control a feature of an application that is also executing on the computer system, such that both the feature control system and the application execute on a same infrastructure of the computer system, the computer system comprising:
- a processor system; and
- a hardware storage system that stores instructions that are executable by the processor system to cause the computer system to perform the following when the instructions are executed by the processor system:
  - access the application, wherein the application includes a feature that is currently turned on such that the feature is available for use, and wherein the application manages a database of information describing a state of the application, wherein the computer system hosts the application;
  - locally instantiate the feature control system that controls whether the feature is turned on or is turned off, wherein the computer system hosts the feature control system such that a same computing infrastructure that hosts the application also hosts the feature control system, wherein the application is executing on a first virtual machine (VM) or within a first container, and wherein the feature control system is executing on a second VM or within a second container such that the feature control system is executing on the computer system externally relative to the application while still using the same computing infrastructure;
  - access time series data describing the information included in the database;
  - in response to analyzing the time series data, detect an anomaly in the time series data;
  - based on the time series data and the detected anomaly, determine that the feature is to be turned off; and
  - cause the feature control system to instruct the application to turn the feature off such that the feature is no longer available for use.

10. The computer system of claim 9, wherein the feature is one of: a visual appearance of a user interface element of the application or a function that is performed by the application.

11. The computer system of claim 9, wherein the feature control system includes a rule, and wherein the feature control system determines that the feature is to be turned off based on an implementation of the rule to the time series data.

12. The computer system of claim 9, wherein the feature control system scales with the state of the application.

13. The computer system of claim 9, wherein the time series data omits personal identifiable information (PII) related to a client of the application, and wherein the time series data is stored in non-persistable memory.

14. A method implemented by a computer system, the method comprising:
- the computer system accessing an application that includes a feature that currently has a first state, wherein the application manages a database of information associated with the application, and wherein the computer system hosts the application;
- the computer system locally instantiating a feature control system that controls whether the feature has the first state or has a second state, wherein the computer system hosts the feature control system such that a same computing infrastructure that hosts the application also hosts the feature control system, wherein the application is executing on a first virtual machine (VM) or within a first container, and wherein the feature control system is executing on a second VM or within a second container such that the feature control system is executing on the computer system externally relative to the application while still using the same computing infrastructure;
- the computer system causing the feature control system to collect data describing the information included in the database;
- in response to the computer system analyzing the data, the computer system detecting an anomaly in the metric data;
- based on the data and the detected anomaly, the computer system causing the feature control system to determine that the feature is to transition from the first state to the second state; and
- the computer system causing the feature control system to instruct the application to transition the feature from having the first state to having the second state.

15. The method of claim 14, wherein the feature control system collects additional data from a source other than the database of information.

16. The method of claim 15, wherein the source is a social media service.

17. The method of claim 14, wherein the data includes one of time series data, local telemetry data, business metric data, or network usage data.

18. The method of claim 14, wherein the feature control system includes a deterministic model comprising logic for determining that the feature is to transition from having the first state to having the second state.

19. The method of claim 14, wherein the feature control system is hosted by the second container.

* * * * *